United States Patent
Fujii et al.

[11] Patent Number: 5,995,472
[45] Date of Patent: Nov. 30, 1999

[54] LASER BEAM FORMING TEMPERATURE DISTRIBUTION OF TWO PEAKS ON A MAGNETO-OPTICAL RECORDING MEDIUM

[75] Inventors: Eiichi Fujii, Kamakura; Koichiro Nishikawa, Takasaki, both of Japan

[73] Assignee: Canon Kabushiki Kaisha, Tokyo, Japan

[21] Appl. No.: 09/069,775

[22] Filed: Apr. 30, 1998

[30] Foreign Application Priority Data

May 6, 1997 [JP] Japan ................................. 9-115791
Sep. 3, 1997 [JP] Japan ................................. 9-238280

[51] Int. Cl.$^6$ .................................................. G11B 11/10
[52] U.S. Cl. ........................... 369/110; 369/13; 369/59; 369/283; 369/275.2
[58] Field of Search ........................ 369/110, 116, 369/13, 121, 118, 112, 44.23, 44.37, 59, 283, 275.2; 428/212, 457, 693

[56] References Cited

U.S. PATENT DOCUMENTS

| | | | |
|---|---|---|---|
| 4,937,799 | 6/1990 | Hashimoto et al. | 369/13 |
| 5,093,822 | 3/1992 | Kugiya et al. | 369/13 |
| 5,260,927 | 11/1993 | Higashihara et al. | 369/110 |
| 5,270,987 | 12/1993 | Kaku et al. | 369/13 |
| 5,329,517 | 7/1994 | Yamaguchi et al. | 369/110 |
| 5,353,266 | 10/1994 | Fujii | 369/13 |
| 5,353,274 | 10/1994 | Nishikawa | 369/121 |
| 5,463,610 | 10/1995 | Nishikawa | 369/121 |
| 5,521,897 | 5/1996 | Nishikawa | 369/112 |
| 5,557,601 | 9/1996 | Nishikawa | 369/121 |
| 5,586,097 | 12/1996 | Nishikawa | 369/112 |
| 5,766,743 | 6/1998 | Fujikata et al. | 428/212 |

FOREIGN PATENT DOCUMENTS 6-290496  10/1994  Japan.

*Primary Examiner*—John W. Cabeca
*Assistant Examiner*—Kim-Kwok Chu
*Attorney, Agent, or Firm*—Fitzpatrick, Cella, Harper & Scinto

[57] ABSTRACT

A method and apparatus for reproducing information on a magneto-optical recording medium can reproduce a signal having a period equal to or smaller than the diffraction limit of light at high speed, can obtain a reproduced signal with a high C/N ratio from a small recorded domain at an amplitude nearly equal to that of a large recorded domain, can greatly improve the recording density and transfer rate, and can also make the reproduction apparatus compact. The information reproduction method includes the steps of irradiating a laser beam onto a medium and forming a temperature distribution having at least two peaks by the laser beam. The apparatus has a laser light source and an optical system for irradiating a laser beam emitted by the light source onto the medium, wherein the laser beam forms the temperature distribution having at least two peaks.

16 Claims, 13 Drawing Sheets

LIGHT FLUX RANGE

LIGHT FLUX RANGE

INTENSITY DISTRIBUTION

TEMPERATURE DISTRIBUTION

LASER BEAM FORMING TEMPERATURE DISTRIBUTION OF TWO PEAKS ON A MAGNETO-OPTICAL RECORDING MEDIUM

BACKGROUND OF THE INVENTION

1. Field of the Invention

The present invention relates to a magneto-optical recording medium or the like which undergoes information recording/reproduction by a laser beam using a magneto-optical effect and, more particularly, a method of reproducing information from a magneto-optical recording medium, that can attain high-density recording of a medium, and an information reproduction apparatus using the magneto-optical recording medium.

2. Related Background Art

As a rewritable, high-density recording scheme, a magneto-optical recording medium that records information by writing domains in a magnetic thin film using heat energy of a semiconductor laser, and reads out that information using a magneto-optical effect has become popular. In recent years, demand has arisen for a large-capacity recording medium by increasing the recording density of such magneto-optical recording medium.

The line recording density of an optical disk such as a magneto-optical recording medium largely depends on the laser wavelength of a reproduction optical system and the numerical aperture of an objective lens. That is, since the beam waist diameter is determined upon determination of the laser wavelength $\lambda$ of the reproduction optical system and the numerical aperture NA of the objective lens, the spatial frequency that can be detected upon reproducing a signal is limited to about $2NA/\lambda$. Therefore, in order to realize high-density recording in a conventional optical disk, the laser wavelength of the reproduction optical system must be shortened, or the numerical aperture NA of the objective lens must be increased. However, a decrease in laser wavelength or an increase in numerical aperture of the objective lens has limitations. For this reason, a technique for increasing the recording density by modifying the structure of the recording medium or its read method has been developed.

For example, Japanese Laid-Open Patent Application No. 6-290496 proposed a method of reproducing a high-density recording signal by making the domain wall present at the boundary of neighboring recording marks move in the presence of a temperature gradient, and detecting the wall motion. According to this method, the wall moves at the instant when the recording medium has been heated to the mobility temperature of the wall, and a high-density recording signal is reproduced by detecting such wall motion. Hence, a signal can be reproduced independently of the diffraction limit of light.

However, the magneto-optical reproduction method described in Japanese Laid-Open Patent Application No. 6-290496 does not consider any measure against noise arising from the influences of a domain wall from behind the beam spot (with respect to the traveling direction).

SUMMARY OF THE INVENTION

The present invention has been made to solve such conventional problems, and has as its object to provide a method and apparatus for reproducing information on a magneto-optical recording medium, which can reproduce a signal having a period equal to or smaller than the diffraction limit of light at high speed, can obtain a reproduced signal with a high C/N ratio from a small recorded domain at an amplitude nearly equal to that of a large recorded domain, can greatly improve the recording density and transfer rate, and can also make the reproduction apparatus compact.

In order to achieve the above object, there is provided an information reproduction method for reproducing information by forming a temperature distribution on a magneto-optical recording medium, and moving a magnetic domain wall, comprising the steps of:

irradiating a laser beam onto the medium; and forming the temperature distribution having at least two peaks by the laser beam.

Also, there is provided an information reproduction apparatus for reproducing information by forming a temperature distribution on a magneto-optical recording medium, and moving a magnetic domain wall, comprising:

a laser light source; and an optical system for irradiating the laser beam emitted by the light source onto the medium, wherein the laser beam forms the temperature distribution having at least two peaks.

The above and other objects of the present invention will become apparent from the following detailed description of the embodiments.

BRIEF DESCRIPTION OF THE DRAWINGS

FIGS. 1A, 1B and 1C show the principle of the reproduction method of the present invention, in which FIG. 1A shows the orientation states of spins in individual magnetic layers in a reproduction state in the section of a medium, FIG. 1B shows the temperature distribution on the medium at that position shown in FIG. 1A, and FIG. 1C shows the distributions of the magnetic domain wall energy density and the force exerted on the magnetic domain wall accordingly at the position shown in FIG. 1A;

DETAILED DESCRIPTION OF THE PREFERRED EMBODIMENTS

Figure 1A:
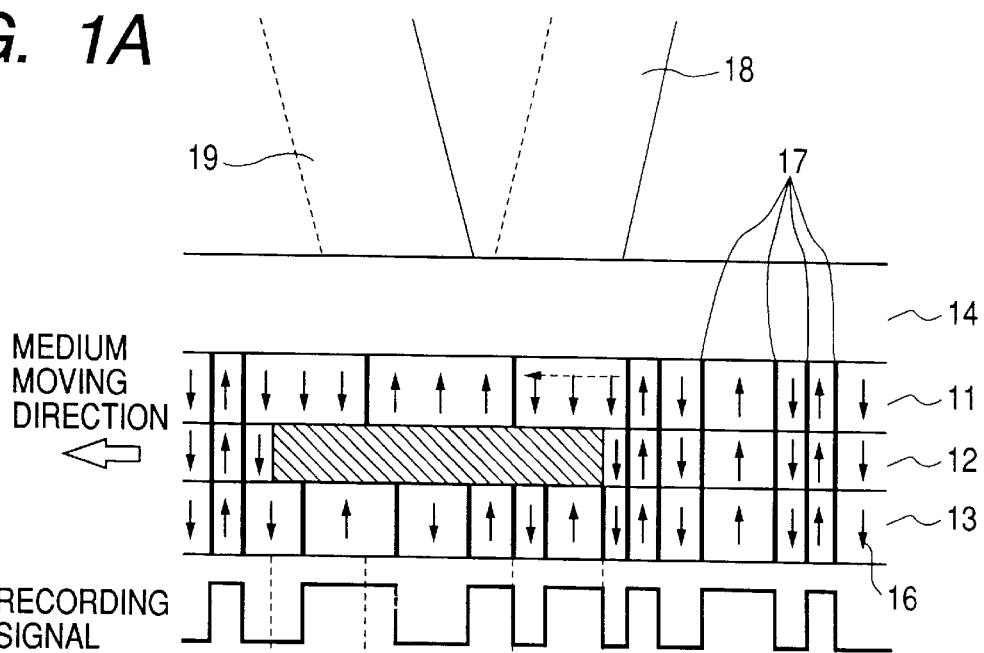
Figure 1B:
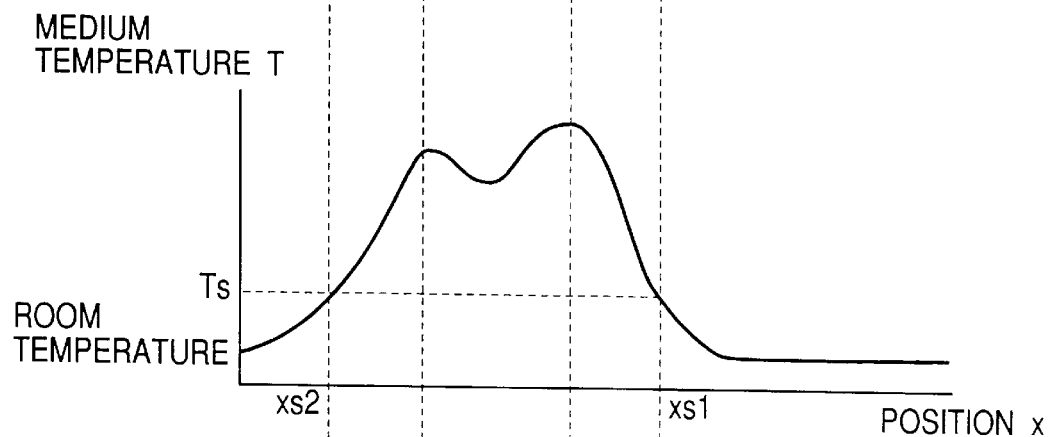
Figure 1C:
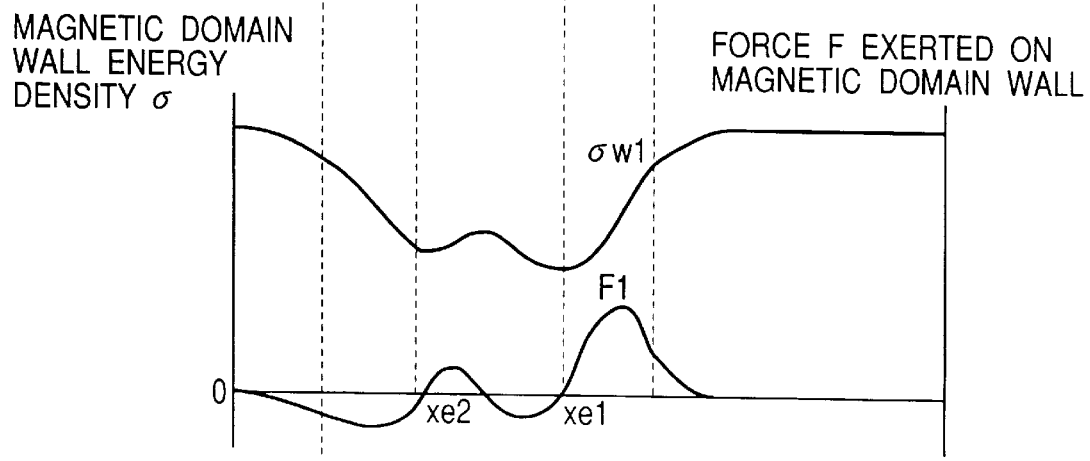

FIGS. 1A to 1C are views for explaining the information reproduction method of the present invention, and the effects in that reproduction method.

FIG. 1A is a sectional view of a magneto-optical recording medium used in the information reproduction method of the present invention. This medium is prepared by sequentially stacking a first magnetic layer 11, second magnetic layer 12, and third magnetic layer 13 on a substrate 14. An arrow 16 in each layer indicates the direction of an atomic spin. A magnetic domain wall 17 is formed at the boundary between neighboring regions where the directions of the spins are opposite to each other. The lower graph in FIG. 1A shows a recording signal in this recording layer.

FIG. 1B is a graph showing the temperature distribution formed in the magneto-optical recording medium of the present invention. This temperature distribution is induced on the medium by heating and reproducing light beam spots 19 and 18. The distribution has at least two maximum temperatures, and the positions and irradiation powers of the reproducing and heating light beam spots 18 and 19 are adjusted so that at least one of these maximum temperatures falls outside the reproducing light beam irradiation range. In FIG. 1B, at positions xs1 and xs2, the medium temperature becomes a temperature Ts which is nearly equal to the Curie temperature of the second magnetic layer 12, and at which exchange coupling between the first and third magnetic layers 11 and 13 disappears.

FIG. 1C is a graph showing the magnetic domain wall energy density $\sigma_w 1$ of the first magnetic layer corresponding to the temperature distribution of FIG. 1B. When the magnetic domain wall energy density $\sigma_w 1$ has a gradient in the x-direction, as shown in FIG. 1C, a force F1 given by the equation below acts on the domain wall of each layer located at a position x:

$$F1 = \frac{\partial \sigma_w 1}{\partial x}$$

This force F1 acts to move the wall toward the lower wall energy side. On the other hand, a force Fs for preventing the domain wall from moving also acts on the wall. Fs is given by:

$$Fs = 2\pi \times Ms1 \times Hw1$$

where Ms1 is the saturation magnetization of the first magnetic layer, and Hw1 is the domain wall coercive force of the first magnetic layer. When the medium temperature is equal to or higher than Ts, if this force Fs is sufficiently small, the wall readily moves by the force F1. On the other hand, in regions before the position xs1 (on the right side in FIG. 1A) and behind the position xs2, since the medium temperature is lower than Ts and the first magnetic layer is exchange-coupled to the third magnetic layer with a large domain wall coercive force, the domain wall in the first magnetic layer is fixed at a position corresponding to that of the domain wall in the third magnetic layer, and the wall in the first does not move.

In the present invention, as shown in FIG. 1A, when each magnetic domain wall 17 is located at the position xs1 of the medium, the medium temperature rises up to the temperature Ts near the Curie temperature of the second magnetic layer, and exchange coupling between the first and third magnetic layers disappears, the magnetic domain wall 17 in the first magnetic layer moves at "high speed" to a region xe1 where the temperature becomes maximum and the magnetic domain wall energy density becomes minimum.

On the other hand, even at a position behind (on the left side in FIG. 1A) the reproducing light beam, the medium temperature rises to the temperature Ts near the Curie temperature of the second magnetic layer at the position xs2 of the medium. In a region closer to the reproducing light beam than the position xs2, exchange coupling between the first and third magnetic layers is null. Hence, the magnetic domain wall 17 moves to a region xe2 where the temperature becomes maximum and the magnetic domain wall energy density becomes minimum. However, in the region between xe1 and xe2, the directions of magnetization are constant, and remain the same during reproduction.

When the magnetic domain wall 17 passes a position below the reproducing light beam spot 18, the atomic spins in the first magnetic layer in the spot mostly align in one direction. Every time the magnetic domain wall 17 reaches the position xs1 upon movement of the medium, the magnetic domain wall 17 passes the position below the spot at high speed, and the directions of atomic spins in the spot mostly reverse and align in one direction. As a consequence, the reproduced signal amplitude always becomes nearly constant independently of the spacing between neighboring walls (i.e., the recording mark length), and a problem pertaining to waveform interference or the like arising from the optical diffraction limit can be solved.

In order to obtain the temperature distribution shown in FIG. 1B, the spacing between the reproducing and heating light beam spots 18 and 19 is preferably set as follows. That is, a spacing d between the centers of the two light beams along a recording track on the recording medium is set to satisfy:

$$(\lambda_1+\lambda_2)/2 \times (2/\pi) \times (\lambda_1/NA) < d < 2 \times (\lambda_1+\lambda_2)/2 \times (2/\pi) \times (\lambda_2/NA)$$

where $\lambda_1$ is the wavelength of the reproducing light beam spot 18, $\lambda_2$ is the wavelength of the heating light beam spot 19, and NA is the numerical aperture of an objective lens for forming these beam spots on a magnetic recording medium (magneto-optical disk).

Furthermore, when the magneto-optical recording medium is formed to have low light absorbency for reproducing the light beam spot and high light absorbency for the heating light beam spot, the temperature distribution shown in FIG. 1B can be obtained without largely dropping the intensity of the reproducing light beam spot, thus obtaining a better reproduced signal. The light absorbencies for the reproducing and heating light beam spots can be adjusted by changing the refractive index and film thickness of a light transmission layer 15. In order to set the light absorbency for reproducing the light beam spot to be sufficiently smaller than that for the heating light beam spot, the refractive index of the light transmission layer 15 is set at 2.0 or more and, preferably, 2.2 or more. When the wavelengths of the heating and reproducing light beam spots are close to each other, the film thickness of the light transmission layer must be increased to obtain a sufficiently large light absorbency difference, resulting in poor yield. Hence, the wavelength of the heating light beam spot is set to be longer than that of the reproducing light beam spot 1.1 times or more and, more preferably, 1.4 times or more (50 nm or more in actual size).

Figure 2A:
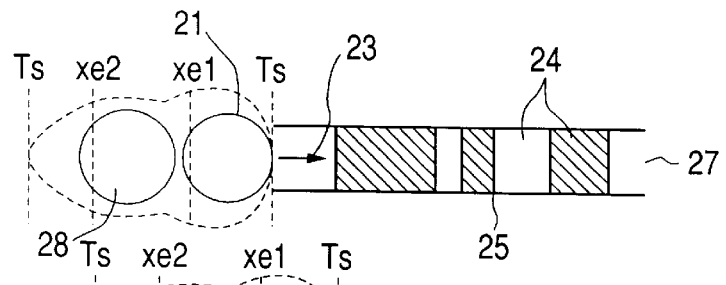
FIGS. 2A, 2B, 2C, 2D, 2E, 2F, 2G and 2H are views for explaining the reproduction method of the present invention.
Figure 2B:
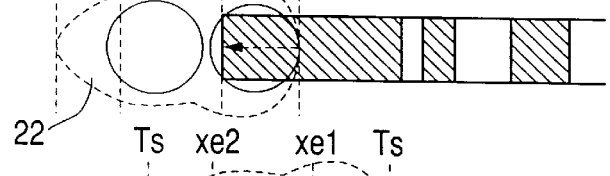
Figure 2C:
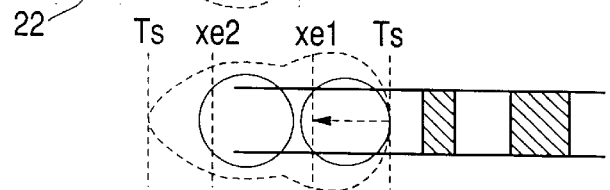
Figure 2D:
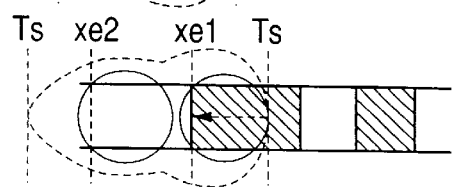
Figure 2E:
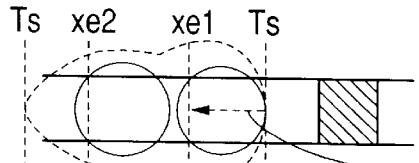
Figure 2F:
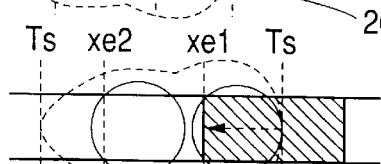
Figure 2G:
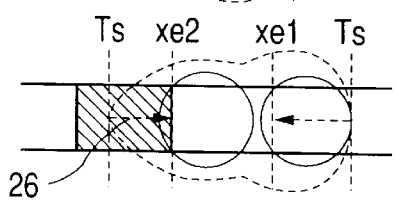
Figure 2H:
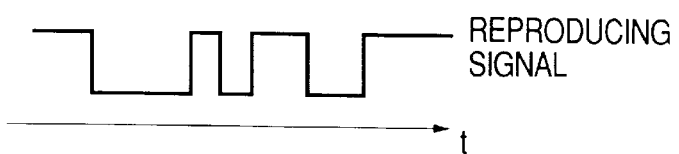

FIGS. 2A to 2H are views for explaining the operation of the present invention when the reproducing light beam spot is moving along an information track. FIGS. 2A to 2G show the moving states of reproducing and heating light beam spots 21 and 28 on an information track 27 formed with magnetic domains 24 having different recording mark lengths. A temperature profile 22 indicates a Ts isothermal line formed on the medium by the reproducing and heating beam spots 21 and 28. FIG. 2H is a graph of the obtained reproduced signal.

Figure 7A:
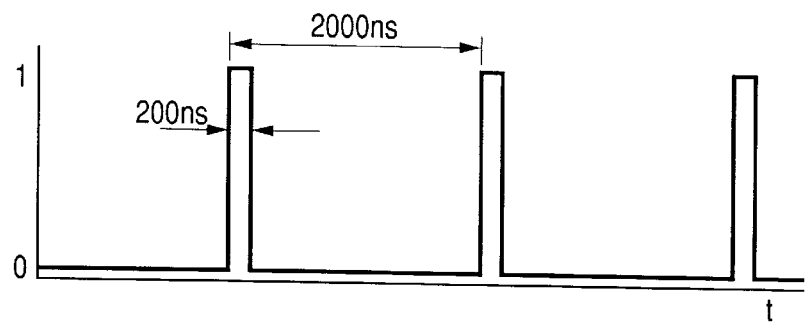
FIGS. 7A, 7B, 7C and 7D are charts showing the recording signal, recording magnetic field, and reproduced signal in the embodiment shown in FIG. 3.
Figure 7B:
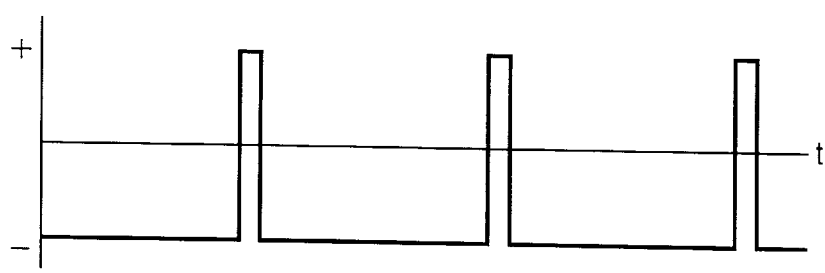

In the present invention, as the reproducing light beam spot 21 moves relative to the information track 27, the temperature profile also moves relatively. With these beam spots, the critical temperature Ts of the second magnetic layer is reached near the leading edge of the reproducing light beam spot 21, and a region where the temperature becomes maximum and the magnetic domain wall energy density becomes minimum is formed behind the center of the reproducing light beam spot. Therefore, at a position in front of the reproducing light beam spot 21, when the reproducing light beam spot 21 reaches a magnetic domain wall 25, the temperature of the magnetic domain wall 25 rises to the critical temperature Ts, and the magnetic wall 25 moves at high speed in the direction indicated by an arrow 26, thus forming a state shown in FIG. 7B in which the recording mark extends to the region xe1 having high temperature and low magnetic domain wall energy density. Every time the reproducing light beam spot 21 moves relative to the track and the portion which is heated to the critical temperature Ts reaches the magnetic domain wall, motion of the magnetic wall takes place, as shown in FIGS. 7C, 7D, 7E, 7F, and 7G, and a reproduced signal with a large amplitude can be obtained, as shown in FIG. 7H.

A portion, which is heated to the critical temperature Ts of the second magnetic layer, is also formed behind the heating light beam spot 28, and wall motion also takes places there. However, since the end point of wall motion, i.e., the region xe2 where the temperature becomes maximum and the magnetic domain wall energy density becomes minimum is located behind the reproducing light beam spot, the wall motion behind the reproducing light beam spot never produces any noise, and a good reproduced signal can be obtained.

Figure 3:
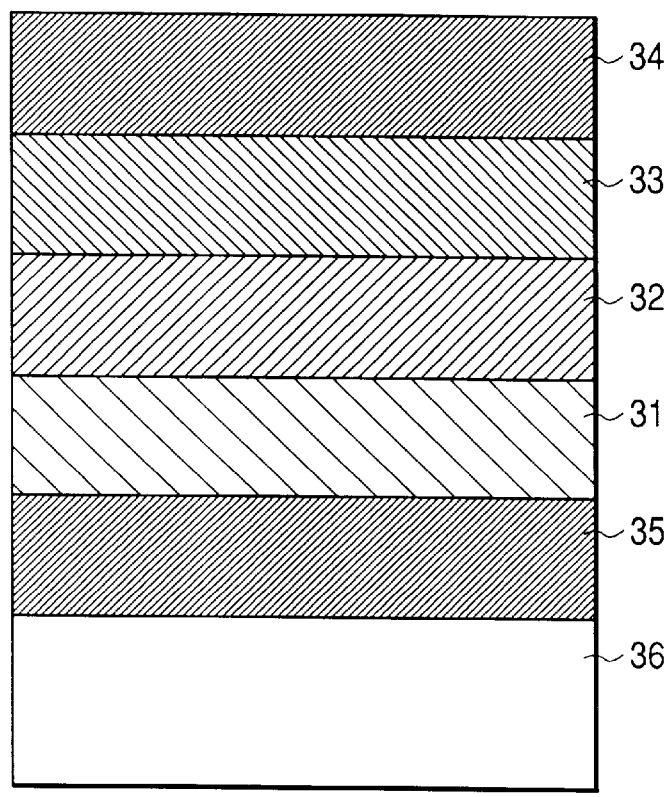
FIG. 3 is a sectional view showing an embodiment of the layer structure of a magneto-optical recording medium used in the present invention.

FIG. 3 is a sectional view showing an embodiment of the layer structure of a magneto-optical recording medium used in the present invention. In this embodiment, a light transmission layer 35, first magnetic layer 31, second magnetic layer 32, third magnetic layer 33, and protection layer 34 are stacked in turn on a transparent substrate 36.

As the material of the transparent substrate 36, for example, polycarbonate, glass, or the like can be used. As the material of the light transmission layer 35, for example, a transparent dielectric material such as $Si_3N_4$, AlN, $SiO_2$, SiO, ZnS, $MgF_2$, or the like can be used. Lastly, the protection layer 34 formed as a protection film can use the same material as that of the light transmission layer 35, or may use other materials with high corrosion resistance such as Al, Cr, Ti, Pt, Au, or the like. These layers can be formed by continuous sputtering or continuous deposition by a magnetron sputtering device. Especially, since the respective magnetic layers are continuously formed without breaking a vacuum, they are exchange-coupled to each other.

A metal layer consisting of Al, AlTa, AlTi, AlCr, Cu, Au, or the like may be added to the above arrangement to adjust the thermal characteristics. Also, a protection coat consisting of a polymer resin may be added. Alternatively, substrates having films formed thereon may be adhered to each other.

In the medium, the magnetic layers 31 to 33 may consist of various kinds of magnetic materials. For example, each magnetic layer may consist of a rare earth-iron group amorphous alloy that contains 10 to 40 atomic % of one or two or more of rare earth metal elements such as Pr, Nd, Sm, Gd, Tb, Dy, Ho, and the like, and 90 to 60 atomic % of one or two or more of iron group elements such as Fe, Co, Ni, and the like. In order to improve the corrosion resistance, a small amount of element such as Cr, Mn, Cu, Ti, Al, Si, Pt, In, or the like may be added.

In case of a heavy rare earth-iron group amorphous alloy, saturation magnetization can be controlled by the composition ratio between the rare earth element and iron group element. The Curie temperature can also be controlled by the composition ratio. However, in order to control the Curie temperature independently of the saturation magnetization, the following method is preferable. That is, a material that substitutes part of Fe by Co is used as the iron group element, and the substitution amount is controlled. More specifically, by substituting 1 atomic % of Fe by Co, a Curie temperature rise of about 6° C. can be expected. Hence, using this relation, the amount of Co to be added is controlled to obtain a desired Curie temperature. By adding a small amount of nonmagnetic element such as Cr, Ti, or the like, the Curie temperature can be lowered. Alternatively, when two or more rare earth elements are used, and their composition ratio is adjusted, the Curie temperature can be controlled.

In addition, materials such as garnet, a platinum group-iron group periodic structure film, a platinum group-iron group alloy, or the like may be used.

The first magnetic layer preferably consists of, for example, a rare earth-iron group amorphous alloy with small perpendicular magnetic anisotropy such as GdCo, GdFeCo, GdFe, NdGdFeCo, or the like, a platinum group-iron group periodic structure film such as Pt/Co, Pd/Co, or the like, or a bubble memory material such as garnet or the like.

The second magnetic layer preferably consists of, for example, a material with low Curie temperature such as TbFe, DyFe, TbDyFe, TbFeCo, DyFeCo, TbDyFeCo, or the like.

The third magnetic layer preferably consists of a material which has large perpendicular magnetic anisotropy and high coercive force, can record small pits, and can stably hold formed recording pits, for example, a rare earth-iron group amorphous alloy such as TbFeCo, DyFeCo, TbDyFeCo, or the like.

A data signal is recorded on the magneto-optical recording medium of the present invention by modulating the external magnetic field while moving the medium and irradiating a laser beam which can set the third magnetic layer at the Curie temperature or higher as DC or pulse light, or by modulating the laser power while applying a magnetic field in a given direction. In the latter case, when the laser beam intensity is adjusted so that only a predetermined region within the beam spot has a temperature near the Curie temperature of the third magnetic layer, a recorded domain equal to or smaller than the beam spot size can be formed, and consequently, a signal having a period equal to or smaller than the diffraction limit of light can be recorded.

EXAMPLES

The present invention will be described in more detail below by way of its examples. However, the present invention is not limited to the following examples within the spirit and scope thereof.

Example 1

After B-doped Si, Gd, Dy, Tb, Fe, and Co targets were attached to a DC magnetron sputtering device, and a polycarbonate substrate formed with tracking guide grooves was fixed to a substrate holder, the interior of a chamber was evacuated by a cryopump to a high vacuum of $1 \times 10^{-5}$ Pa or less. While maintaining vacuum, Ar and $N_2$ gases were supplied into the chamber up to 0.3 Pa, and a 1,000-Å SiN layer was formed as a light transmission layer for protecting the magnetic layers and adjusting the reflectance while rotating the substrate. Subsequently, while maintaining vacuum, Ar gas was supplied into the chamber up to 0.3 Pa, and a 300-Å GdCo layer serving as a first magnetic layer, 100-Å DyFe layer serving as a second magnetic layer, and 400-Å TbFeCo layer serving as a third magnetic layer were formed in turn while rotating the substrate. Lastly, an 800-Å SiN layer was formed as a protection layer under the same conditions as those upon forming the light transmission layer. The mixing ratio of Ar and $N_2$ gases was adjusted so that the SiN layer had a refractive index of 2.3. The respective magnetic layers were formed by applying DC power to the Gd, Dy, Tb, Fe, and Co targets. The compositions of the respective magnetic layers were controlled to be nearly compensation compositions, and the Curie temperatures of the first, second, and third magnetic layers were respectively set around 250° C., 160° C., and 290° C.

Figure 4:
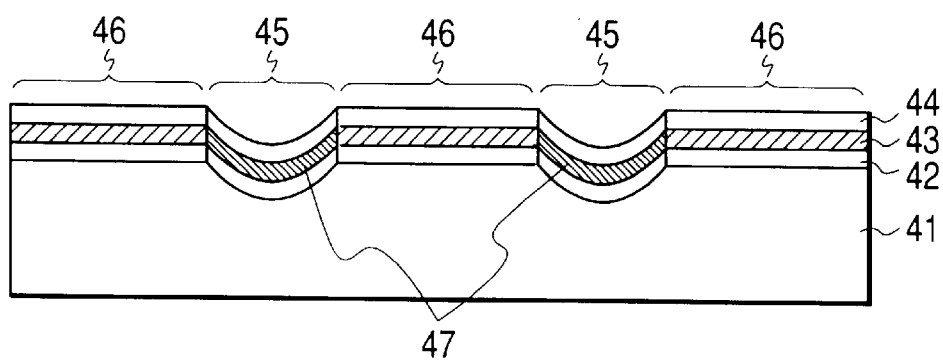
FIG. 4 is a sectional view showing the sectional shape of the magneto-optical recording medium in the embodiment shown in FIG. 3.

A high-power laser beam was focused and irradiated onto each groove of this medium to heat only the groove portion to a temperature of 500° C. or higher. As shown in FIG. 4 that shows the sectional shape, this medium is obtained by stacking a light transmission layer 42, magnetic layer 43, and protection layer 44 on a substrate 41. The magnetic layer stacked on each groove portion 45 has changed into a nonmagnetic layer 47 as a result of the heat treatment. The nonmagnetic layer 47 electrically isolates the magnetic layer 43 stacked on each land 46 at the groove portion 45. In practice, even when the magnetic layer on the groove portion does not perfectly change to a nonmagnetic layer, coupling at the groove portion can be ignored as long as the saturation magnetization becomes sufficiently small.

Figure 5:
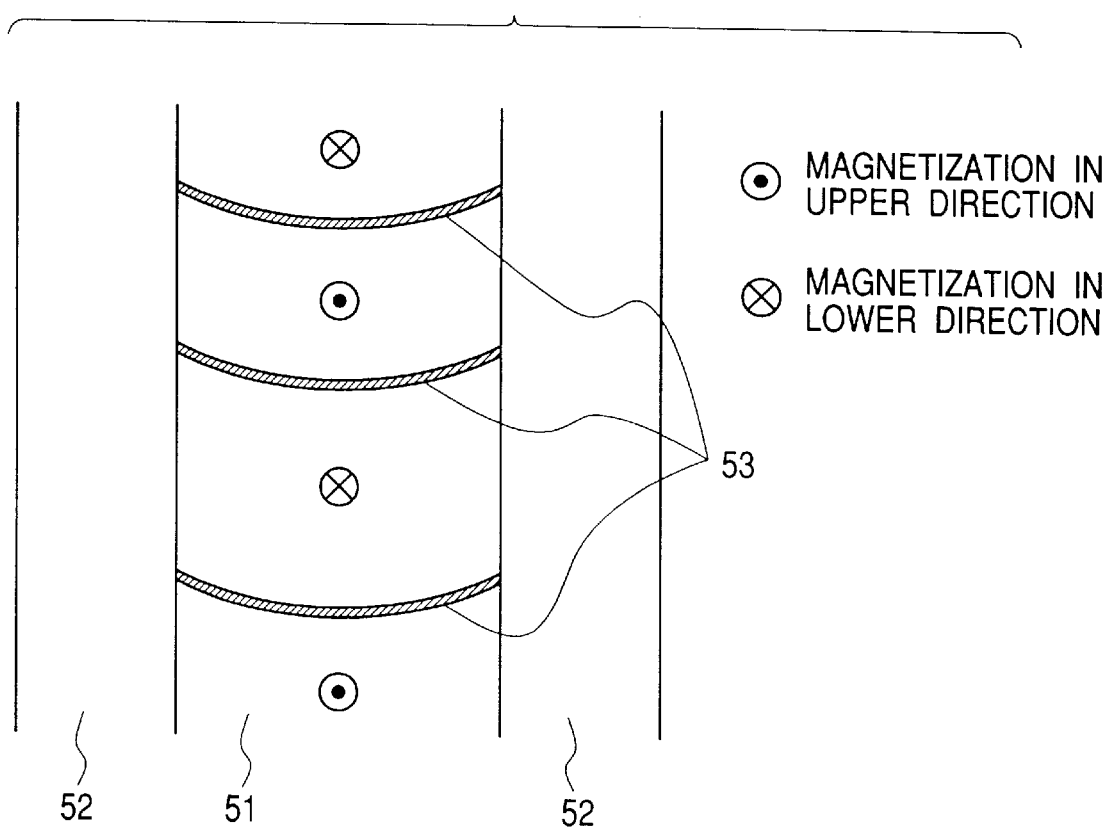
FIG. 5 is a view showing the magnetization state of the magneto-optical recording medium in the embodiment shown in FIG. 3.

In the present invention, magnetic isolation between neighboring information tracks includes such state. When reversing domains are formed on the land 46 to have a width equal to that of the land 46, magnetic domain walls 53, which are not closed, are formed at the boundaries between neighboring domains on a land 51, as shown in FIG. 5. Such magnetic domain wall 53 can be easily moved, since no walls appear on/disappear from the side portions of the tracks even when it is moved in the track direction.

Figure 6:
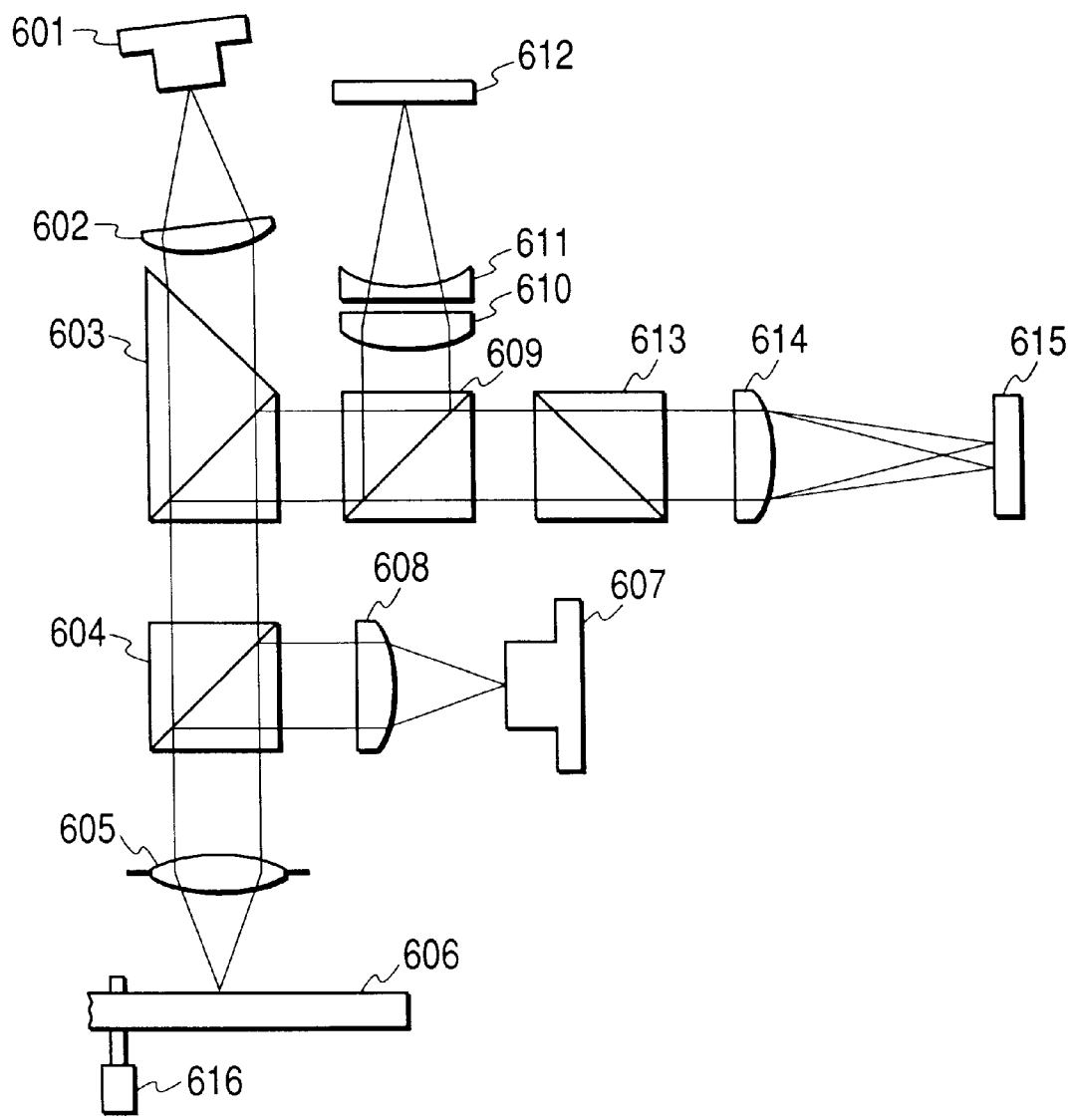
FIG. 6 is a schematic diagram showing an information reproduction apparatus used in the embodiment shown in FIG. 3.

The recording/reproduction characteristics of the obtained magneto-optical recording medium were measured. A recording/reproduction apparatus used in the measurement is a 2-beam magneto-optical disk recording/reproduction apparatus having an optical system for forming a heating beam spot, as shown in FIG. 6. A recording/reproduction laser light source 601 has a wavelength of 680 nm, and is set to supply p-polarized light to the recording medium. A beam splitter 603 with a beam shaper is designed to transmit 70 to 80% of p-polarized light, and to reflect 100% of s-polarized light. An objective lens 605 is designed in correspondence with the wavelength of the recording/reproduction laser light source, and has an NA=0.55. The objective lens 605 undergoes track control and focus control by a servo actuator and servo circuit, so as to focus the recording/reproduction laser beam on an information track of a magneto-optical disk 606. A heating beam laser light source 607 has a wavelength of 780 nm. A beam splitter 604 transmits 100% of light coming from the recording/reproduction laser light source, and reflects 100% of light coming from the heating beam laser light source. A beam splitter 609 distributes reflected light from the magneto-optical disk 606 to an RF sensor 615 for detecting an information signal, and a servo sensor 612 for detecting a track error signal and focus error signal. A birefringence crystal 613 separates polarization components that make ±45° with the incident light so as to differentially detect the light reflected by the magneto-optical disk 606.

The recording medium 606 was rotated by a spindle motor 616 at a velocity of 2 m/s relative to the recording/reproducing beam, and a magnetic field was modulated at ±200 Oe while irradiating a DC recording/reproducing laser beam of 6 mW, thereby forming a repetitive pattern of down/up domains corresponding to the modulated magnetic field in a cooling process after the medium was heated up to the Curie temperature of the third magnetic layer. The modulation frequency of the recording magnetic field was changed from 1 to 10 MHz, thereby recording patterns having mark lengths ranging from 1.0 to 0.1 µm.

The C/N ratios of the patterns with the respective mark lengths were measured by setting the powers of the reproducing and heating light beams at 2.3 mW and 2.5 mW, and setting the center of the heating light beam 1.3 µm behind that of the reproducing light beam along the recording track. As a result, uniform C/N ratios of 45 dB±1 dB were obtained from the patterns having mark lengths ranging from 0.1 µm to 1.0 µm.

According to the reproduction method of the present invention, since the recorded mark is enlarged in the reproducing spot and is then detected, not only signals having a period equal to or smaller than the diffraction limit of light can be reproduced, but also the dependence of C/N on the mark length can be nearly perfectly removed.

Example 2

A magneto-optical recording medium was prepared by forming thin films on a polycarbonate substrate using the same film formation device and method as those in Example 1. The magneto-optical recording medium was rotated at a velocity of 2 m/s relative to the recording/reproducing light beam using the same recording/reproduction apparatus as in Example 1, and a magnetic field shown in FIG. 7B was applied while irradiating a DC recording/reproducing laser beam at 6 mW, thus recording a signal shown in FIG. 7A. This signal is recorded as 0.4-µm long marks aligned at 4-µm spacings. The intensity of the magnetic field was ±200 Oe.

Figure 7C:
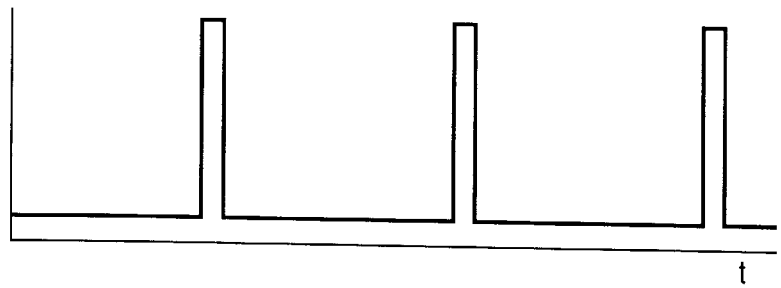

These recording marks were reproduced by setting the powers of the reproducing and heating light beams at 2.3 mW and 2.5 mW, and setting the center of the heating light beam 1.5 µm behind that of the reproducing light beam along the recording track, and the reproduced signal was observed using an oscilloscope. FIG. 7C shows the reproduced waveform at that time. In this way, the reproduction method of the present invention could obtain a reproduced signal having a waveform with a large amplitude and similar to a rectangular wave.

Example 3

The spacing between the centers of the heating and reproducing light beams was changed to 0.8 µm, 0.9 µm, 1.0 µm, 1.1 µm, 1.2 µm, 1.3 µm, 1.4 µm, 1.5 µm, 1.6 µm, 1.7 µm, and 1.8 µm, and waveform observation was done following the same procedures as in Example 2. As a result, when the spacing between the centers of the heating and reproducing light beams fell within the range from 0.9 µm to 1.6 µm, a reproduced waveform which was free from any noise and similar to a rectangular wave was obtained, as shown in FIG. 7C. Since the spot spacing that can obtain a good reproduced signal depends on the spot sizes of the heating and reproducing light beams, the following relation pertaining to the spot sizes was obtained by summarizing the above experimental results. More specifically, a good reproduced signal can be obtained when a spacing d between the centers of the two light beams along a recording track on the recording medium is set to satisfy:

$$(\lambda_1+\lambda_2)/2\times(2/\pi)\times(\lambda_1/NA)<d<2\times(\lambda_1+\lambda_2)/2\times(2/\pi)\times(\lambda_2/NA)$$

where $\lambda_1$ is the wavelength of the reproducing light beam spot, $\lambda_2$ is the wavelength of the heating light beam spot, and NA is the numerical aperture of an objective lens for forming these beam spots on a magnetic recording medium (magneto-optical disk).

Figure 7D:
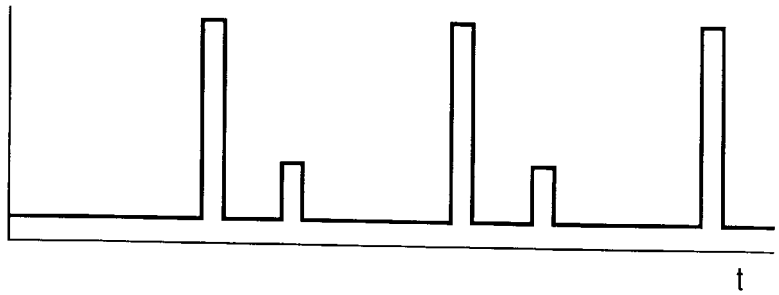

On the other hand, when the spacing between the centers of the heating and reproducing light beams fell outside the range of the above inequality, i.e., 0.8 µm, 1.7 µm, and 1.8 µm, a reproduced waveform shown in FIG. 7D was obtained, and a delayed signal of the original reproduced signal was observed as noise under the influence of a wall that followed the reproducing light spot from behind in its moving direction.

Example 4

Figure 8A:
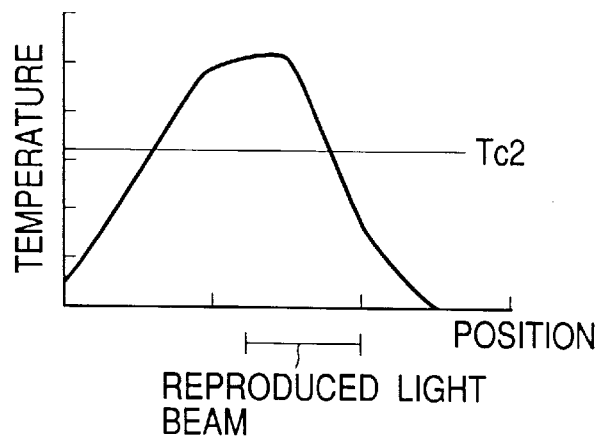
FIGS. 8A, 8B, 8C and 8D are graphs showing the simulation results of the temperature distribution along an information track in the embodiment shown in FIG. 3.
Figure 8B:
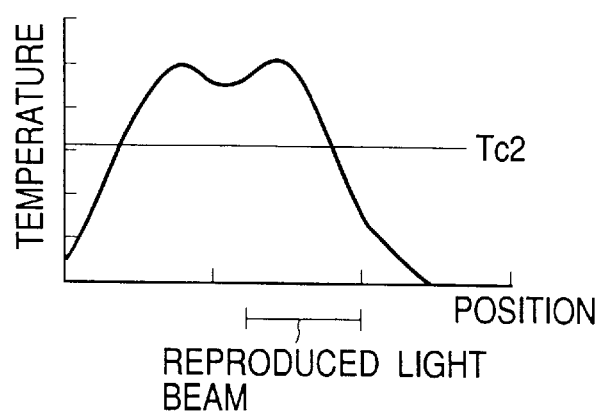
Figure 8C:
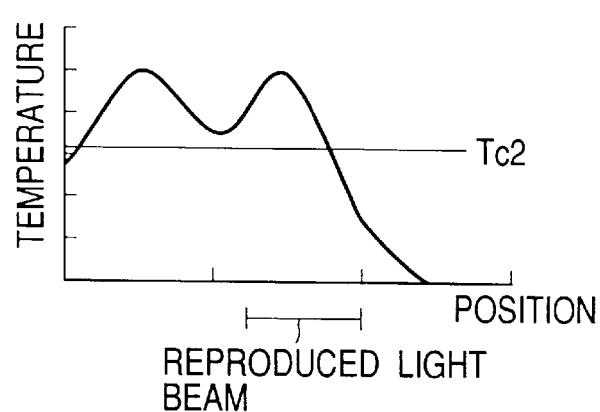
Figure 8D:
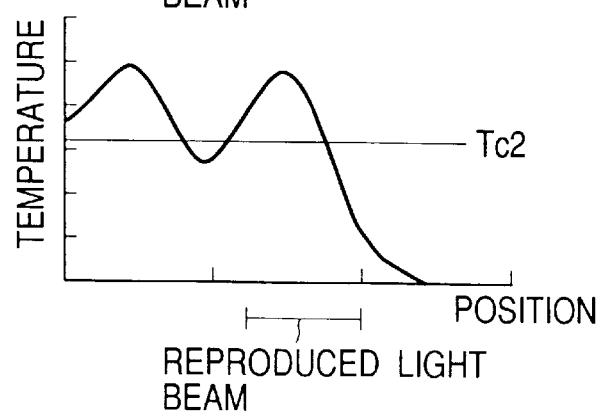

When the wavelength, NA, and power of the reproducing light beam were respectively set at 680 nm, 0.55, and 2.3 mW, those of the heating light beams were respectively set at 780 nm, 0.55, and 2.5 mW, and the relative velocity between the reproducing light beam and magneto-optical recording medium was 2 m/s, changes in temperature distribution of the medium depending on the spacing between the centers of the heating and reproducing light beams were examined by simulations. The structure of the magneto-optical recording medium was the same as that in Example 1. FIGS. 8A to 8D show the temperature distributions at positions which pass the centers of the heating and reproducing light beams and are plotted along the relative moving direction between the light beam and medium. FIG. 8A shows the case wherein the spacing between the centers of the heating and reproducing light beams is 0.8 µm; FIG. 8B, 1.1 µm; FIG. 8C, 1.5 µm; and FIG. 8D, 1.7 µm. In FIGS. 8A to 8D, the right side agrees with the front side in the relative moving direction. The horizontal line indicated by Tc2 represents the Curie temperature of the second magnetic layer. Each figure also shows the irradiation position of the reproducing light beam.

When the spacing between the heating and reproducing light beams is 1.1 µm and 1.5 µm, a temperature distribution having at least two maximum temperatures and one minimum temperature along the information track is formed, and the minimum temperature is higher than the temperature Ts which is in the neighborhood of the Curie temperature of the second magnetic layer, and at which exchange coupling between the first and third magnetic layers disappears. When such temperature distribution is formed, a good reproduced signal can be obtained, as can be seen from the experimental results described in Example 3.

In Example 3, when the spacing between the centers of the heating and reproducing light beams was 0.8 µm, a delayed signal of the original reproduced signal was observed as noise under the influence of a wall that followed the reproducing light spot from behind in its moving direction. As can be understood from FIG. 8A, such noise is produced since no temperature distribution having at least two maximum temperatures and one minimum temperature is formed along the information track; the wall that follows the reproducing light spot from behind in its moving direction falls within the irradiation range of the reproducing light beam.

Furthermore, in Example 3, when the spacing between the centers of the heating and reproducing light beams was 1.7 µm, a delayed signal of the original reproduced signal was observed as noise under the influence of a wall that followed the reproducing light spot from behind in its moving direction. As can be seen from FIG. 8D, such noise is produced since the minimum temperature is lower than the temperature Ts which is in the neighborhood of the Curie temperature of the second magnetic layer, and at which exchange coupling between the first and third magnetic layers disappears. Thus, a domain recorded in the third magnetic layer in the vicinity of the region having the minimum temperature was transferred to the first magnetic layer, and a wall produced as a consequence of such transfer fell within the irradiation range of the reproducing light beam. Note that transfer of the domain recorded in the third magnetic layer in the vicinity of the region having the minimum temperature takes places at a temperature at which the minimum temperature is lower than at least Ts, and the actual transfer temperature changes depending on the size of the recording mark, the structure of the medium, and the like.

As can be seen from the above description, when a temperature distribution having at least two maximum temperatures and one minimum temperature along the information track is formed and, more preferably, a temperature distribution in which the minimum temperature is higher than the temperature Ts which is in the neighborhood of the Curie temperature of the second magnetic layer, and at which exchange coupling between the first and third magnetic layers disappears, is formed on the medium, a good reproduced signal can be obtained.

Example 5

This example practices the present invention using a beam.

Example 5 will be explained below with reference to the accompanying drawings.

Figure 9:
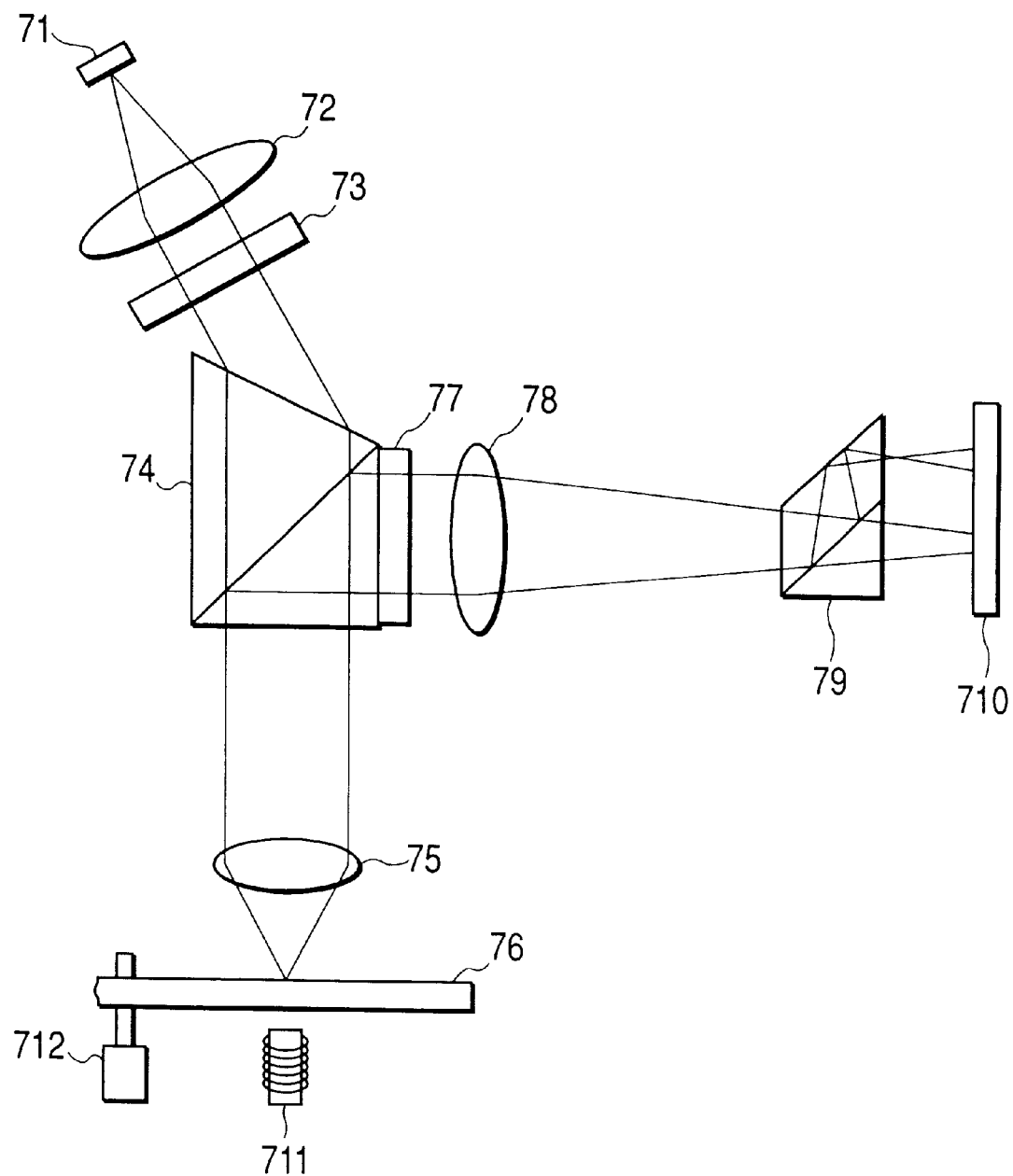
FIG. 9 is a schematic view showing an example of an optical head according to Example 5.

FIG. 9 shows an example of the arrangement of an optical system of an apparatus according to this example. In FIG. 9, a beam emitted by a semiconductor laser 71 is converted into a collimated beam by a collimator lens 72, and the collimated beam forms a reproducing light spot on a recording medium 76 by an objective lens 75 via a phase filter 73 and a beam splitter 74 with a beam shaper. Light reflected by the recording medium 76 is split by the beam splitter 74 with the beam shaper, and its plane of polarization is rotated about 45° by a half-wave plate 77. Then, the light beam is focused by a focusing lens 78 on a sensor 710 via a polarization beam splitter 79. The output photoelectrically converted by the sensor 710 is arithmetically operated to obtain a servo signal and information data signal. An external magnetic head 711 disposed below the recording medium 76 on the side opposite to the objective lens 75 is used for recording information on the recording medium 76. Note that a spindle motor 712 rotates the recording medium 76.

Figure 10:
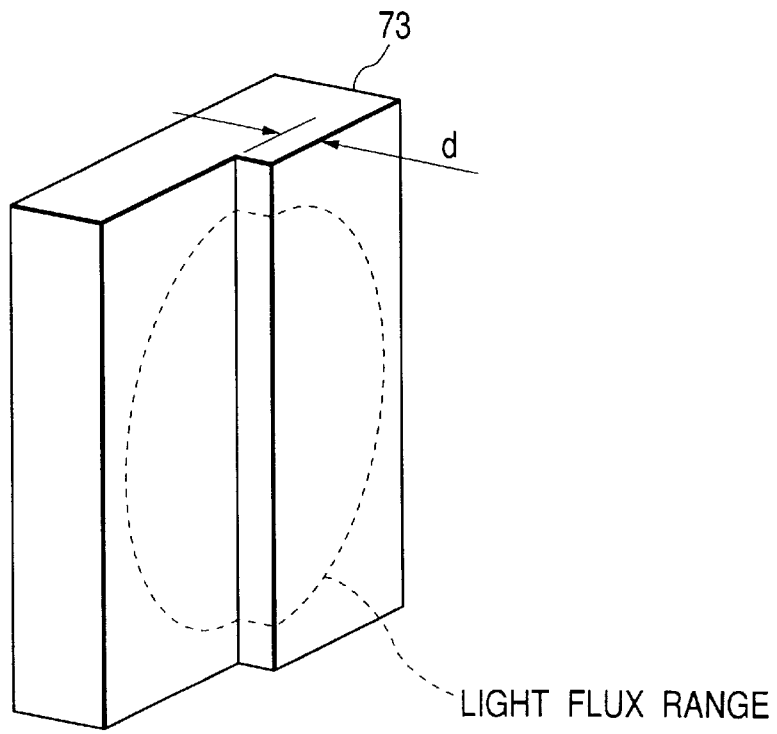
FIG. 10 is a perspective view showing an example of the shape of a phase filter shown in FIG. 9.

The phase filter 73 shown in FIG. 9 gives a phase distribution to the light beam emitted by the semiconductor laser 71. FIG. 10 shows the shape of the phase filter 73.

In this case, after the beam emitted by the semiconductor laser 71 is converted into a collimated beam by the collimator lens 72, a phase difference corresponding to a staircase-like optical path length difference of $(n-1) \cdot d$ is given to the light flux that passes through the filter (n is the refractive index of glass that makes up the phase filter 73), since the thickness of the phase filter 73 changes in a staircase pattern at nearly the central position of the beam light flux to have a difference corresponding to a thickness d.

Figure 11A:
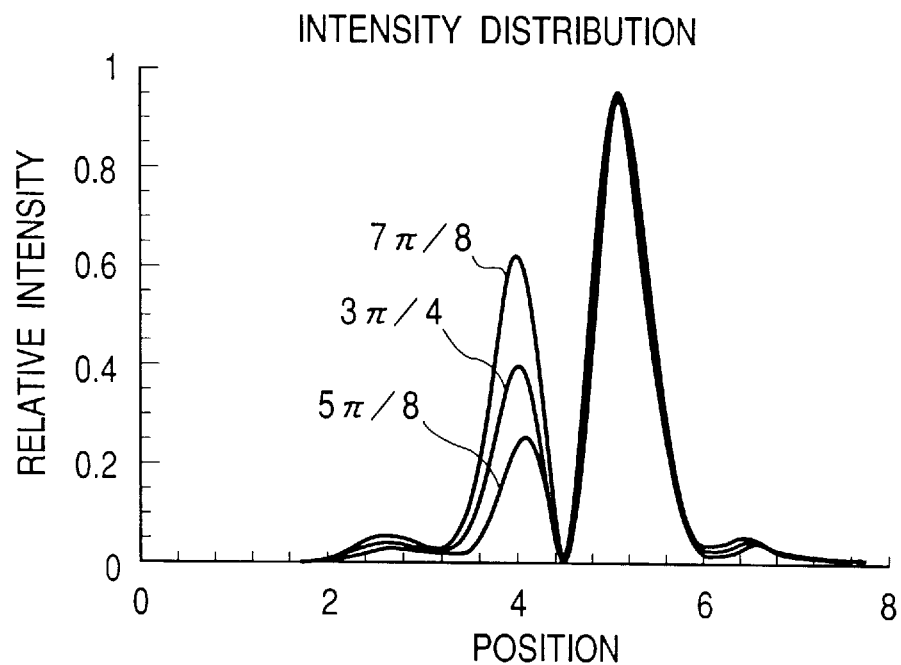
FIGS. 11A and 11B are graphs showing the spot intensity and temperature distributions on a recording medium when the phase filter shown in FIG. 10 is used.
Figure 11B:
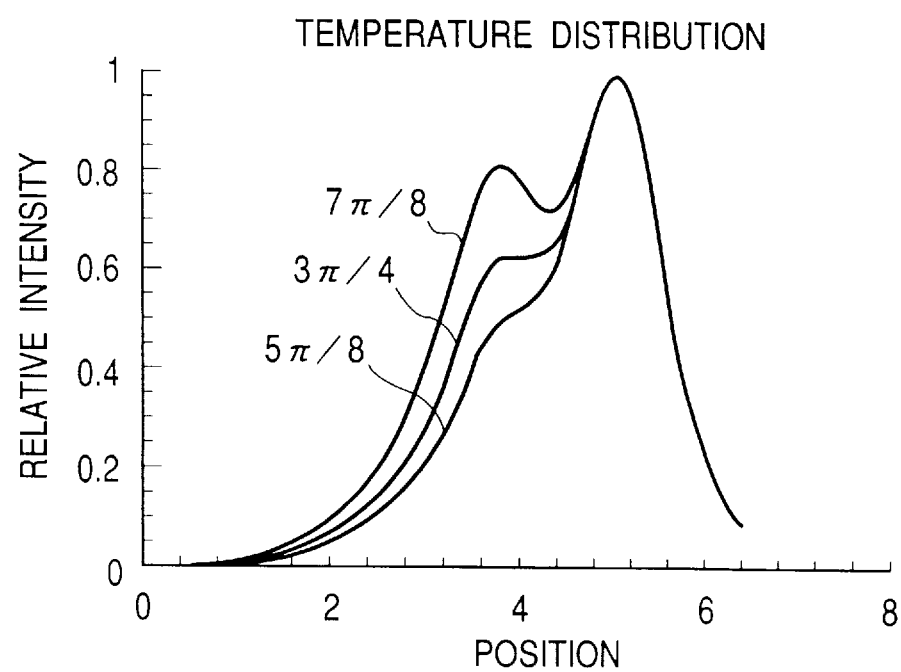

FIG. 11A shows the section of the spot intensity distribution formed when the light flux that has passed through the phase filter 73 is imaged by the objective lens 75. FIG. 11A shows cases of the given phase differences $5 \cdot \pi/8$, $3 \cdot \pi/4$, and $7 \cdot \pi/8$. FIG. 11B shows the section of the corresponding temperature distributions on the recording medium. Especially, the phase difference formed by the phase filter 73 is given to produce steps that perpendicularly divide the medium moving direction.

Note that the NA of the objective lens 75 is 0.55, the oscillation wavelength of the semiconductor laser is about 680 nm, and the incoming light diameter to the objective lens 75, which is defined by $1/e^2$ the intensity is 1.1 to 1.2 times the entrance pupil diameter of the objective lens 75.

As can be seen from FIG. 11B, temperature distributions each having a region in which the temperature does not monotonously decrease from the temperature peak position can be formed on the downstream side with respect to the recording medium moving direction. Note that each of the phase differences $5 \cdot \pi/8$, $3 \cdot \pi/4$, and $7 \cdot \pi/8$ indicates a variable $\alpha$ in:

$N \cdot \pi + \alpha$ (N is an integer)

for $0 < \alpha < \pi$

As will be described later, in this example, the wall motion start temperature Ts is in the neighborhood of the temperature value of the region where the temperature does not monotonously decrease from the temperature peak position. For this reason, when the phase difference becomes larger than $7 \cdot \pi/8$, both the intensity and temperature distributions are expected to unwantedly have two peaks having nearly equal values. This is because the temperature distribution is formed by a single beam in the embodiment of the present invention. As a result, if the temperature distribution has two large peaks, they appear close to each other, and domain wall motion from behind the light spot (with respect to the moving direction of the light spot) cannot be sufficiently suppressed. On the other hand, when the phase difference is smaller than $5 \cdot \pi/8$, a temperature distribution in which the temperature approximately monotonously decreases from the temperature peak position is formed, as is evident from FIG. 11B.

Figure 12:
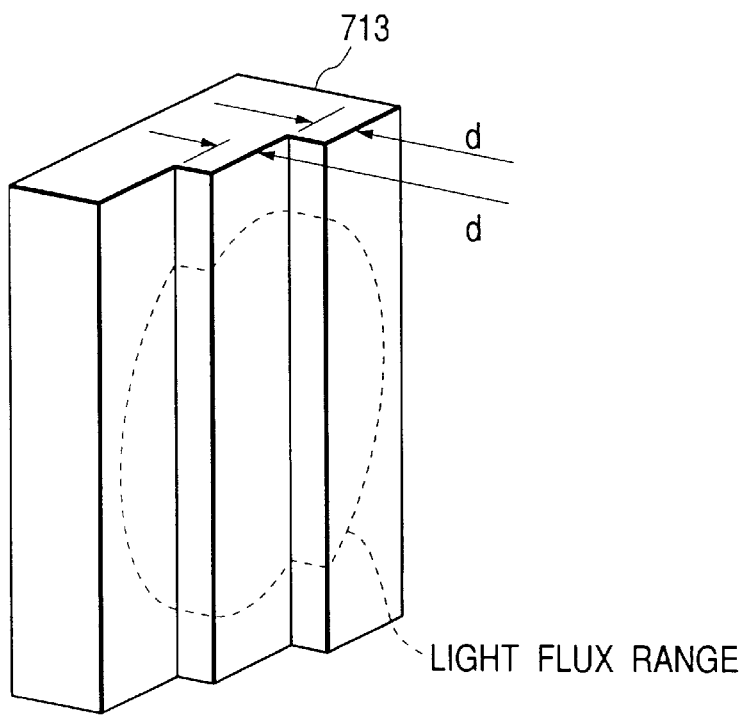
FIG. 12 is a perspective view showing another example of the shape of the phase filter shown in FIG. 9.

FIG. 12 shows the shape of another phase filter 713. In this case, the thickness of the phase filter changes in a staircase pattern at positions that divide the light flux within the light flux range into three beams, and respectively correspond to ¼ and ¾, and the filter gives, to the light flux that passes through the filter, phase differences corresponding to staircase-like optical path length differences:

$(n-1) \cdot d$ (n is the refractive index of the filter 713, and d is the thickness difference)

Figure 13A:
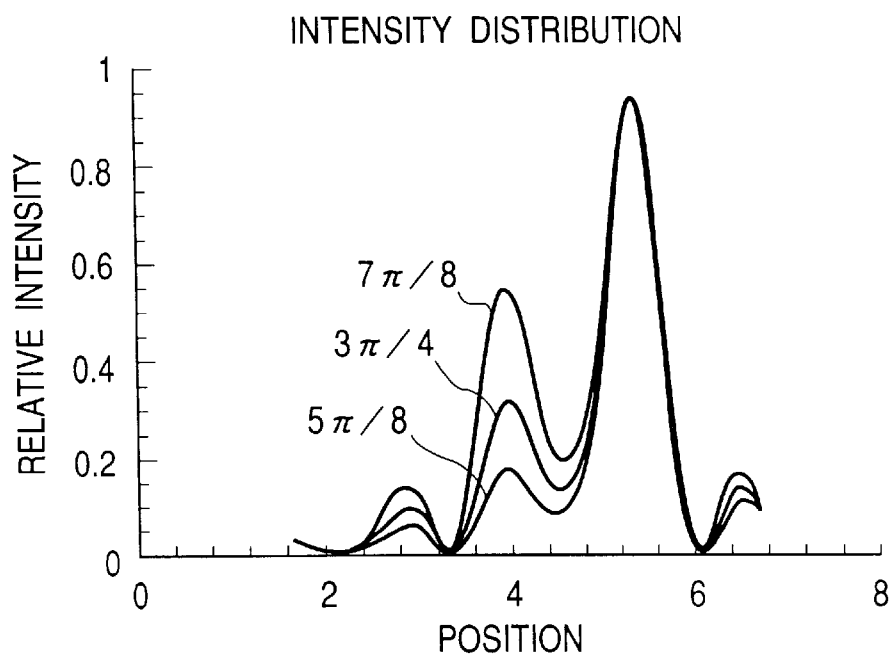
FIGS. 13A and 13B are graphs showing the spot intensity and temperature distributions on a recording medium when the phase filter shown in FIG. 12 is used.
Figure 13B:
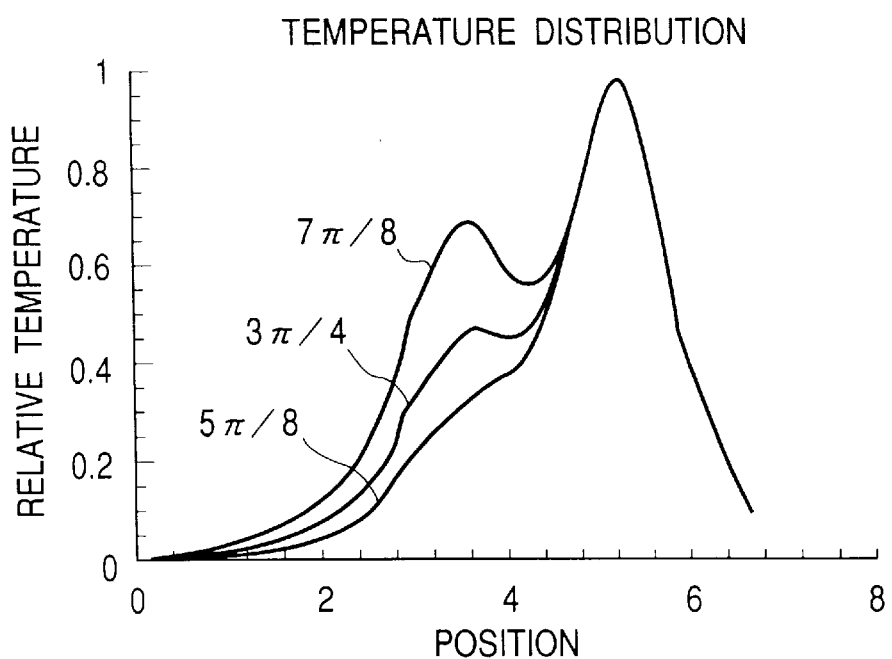

FIG. 13A shows the section of the spot intensity distribution formed when the light flux that has passed through the phase filter 713 is imaged by the objective lens 75. FIG. 13A shows cases of the phase differences $5 \cdot \pi/8$, $3 \cdot \pi/4$, and $7 \cdot \pi/8$ given by the phase filter 713. FIG. 13B shows the section of the corresponding temperature distributions on the recording medium. Especially, the phase difference is given to produce steps that perpendicularly divide the medium moving direction.

As can be seen from FIG. 13B, temperature distributions each having a region in which the temperature does not monotonously decrease from the temperature peak position can be formed on the downstream side with respect to the recording medium moving direction. Note that each of the phase differences $5 \cdot \sigma/8$, $3 \cdot \pi/4$, and $7 \cdot \pi/8$ indicates a variable $\alpha$ in:

$N \cdot \pi + \alpha$ (N is an integer)

for $0 \leq \alpha < \pi$

As can be speculated from FIG. 13B, as in the phase filter 73, the phase difference preferably approximately satisfies:

$5 \cdot \pi/8 < \alpha < 7 \cdot \pi/8$

If the phase filter uses, for example, optical glass having a refractive index $n=1.51$ when the wavelength $\lambda=680$ nm, the thickness difference d for obtaining the phase difference=$3 \cdot \pi/4$ is $(3 \cdot \pi/4) \cdot (\lambda/\pi)/(n-1) \cong 500$ nm.

Figure 14:
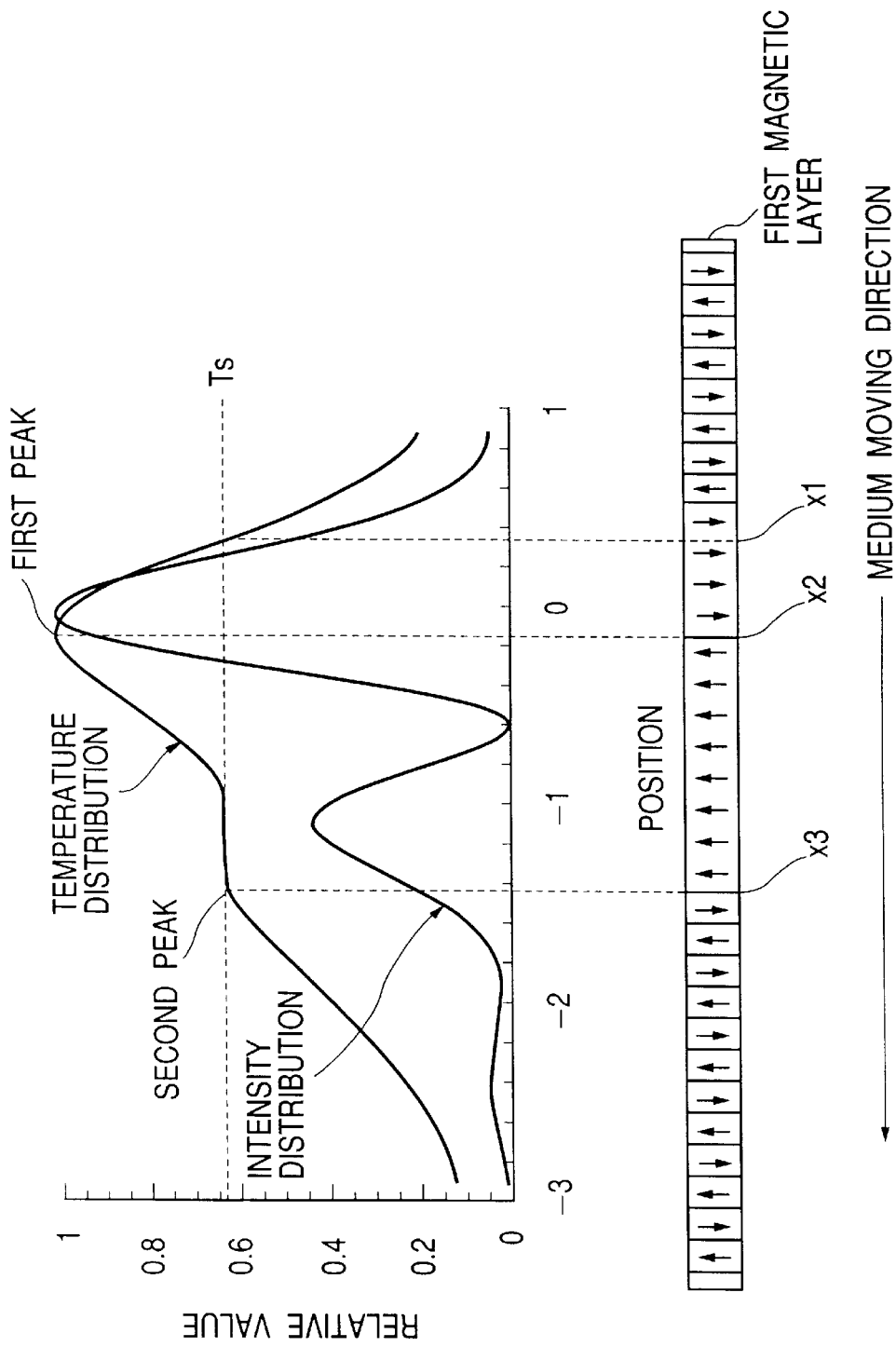
FIG. 14 is a graph showing the spot intensity and temperature distribution on the recording medium and the directions of magnetization in a first magnetic layer when the phase filter (phase difference $3\pi/4$) shown in FIG. 10 is used.
Figure 15:
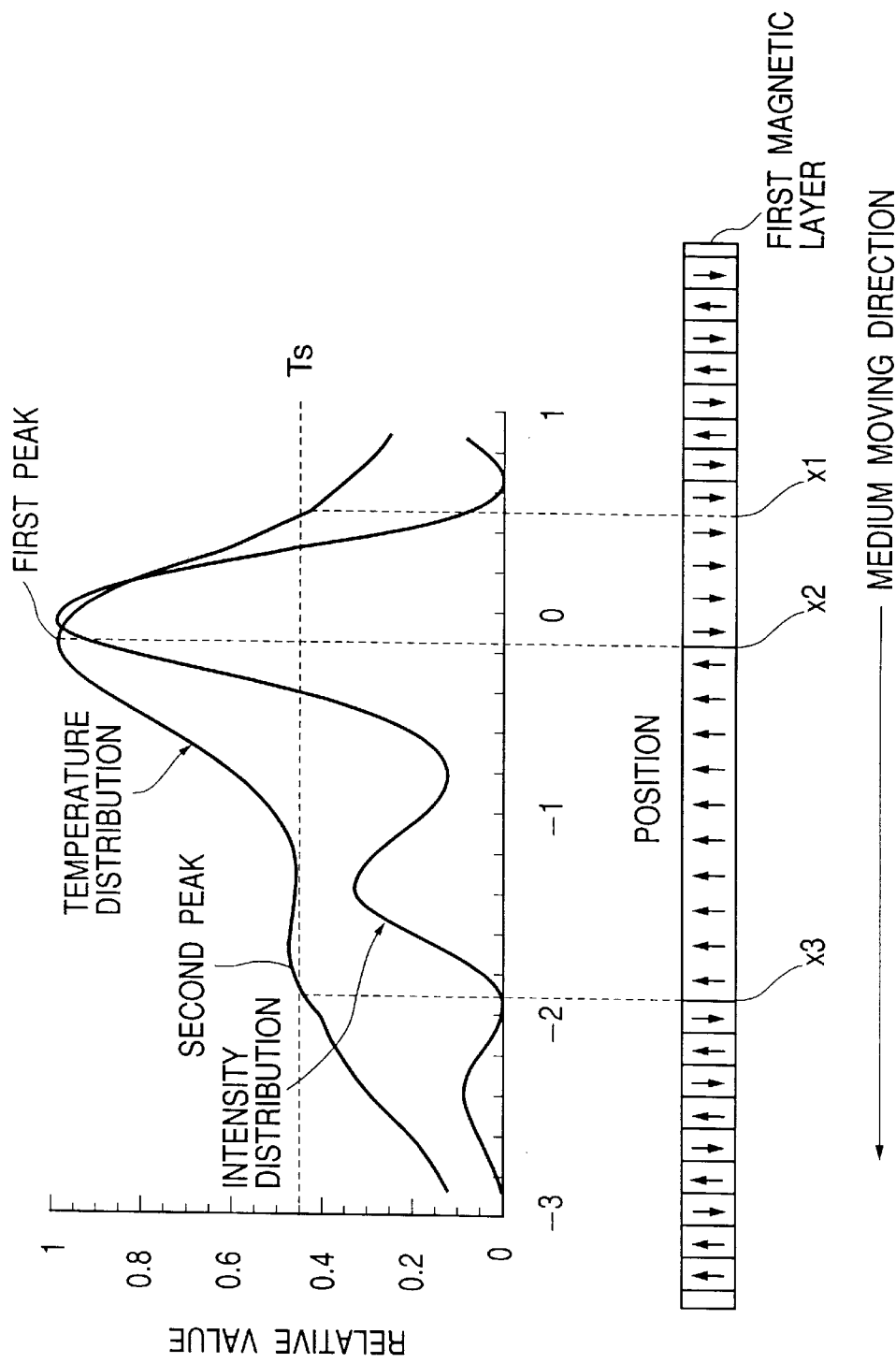
FIG. 15 is a graph showing the spot intensity and temperature distribution on the recording medium and the directions of magnetization in a first magnetic layer when the phase filter (phase difference $3\pi/4$) shown in FIG. 12 is used.

The operation will be explained below with the aid of the drawings. FIG. 14 shows the spot intensity distribution and temperature distribution on the recording medium when the phase filter 73 is used, and the directions of magnetization of the first magnetic layer in the recording medium at that time. FIG. 15 shows the spot intensity distribution and temperature distribution on the recording medium when the phase filter 713 is used, and the directions of magnetization of the first magnetic layer in the recording medium at that time. In either case, a phase filter having a phase difference of approximately $3 \cdot \pi/4$ is used.

Assume that the spot intensity on the recording medium is controlled so that the wall motion start temperature Ts is present in the neighborhood of a region in which the temperature does not monotonously decrease from the first temperature peak position.

Also, the temperature in the period from x1 to x3 is equal to or higher than the critical temperature Ts.

Upon movement of the medium, when a domain wall has reached a position x1 upstream with respect to the moving direction of the recording medium, wall motion takes place, i.e., the domain wall at the position x1 moves to the first temperature peak position x2. As a result, the domain is enlarged within the light spot, and a small mark is reproduced in the enlarged scale.

On the other hand, at the position x3 of the wall motion start temperature Ts downstream with respect to the moving direction of the recording medium, the first and third magnetic layers are exchange-coupled again when the temperature becomes equal to or lower than Ts, and the domain recorded in the third magnetic layer is re-transferred to the first magnetic layer. However, since the wall motion start temperature Ts is present in the neighborhood of a region in which the temperature does not monotonously decrease from the first temperature peak position, the temperature gradient is small, or the second temperature peak position is present near the position x3, as can be seen from FIGS. 14 and 15.

As was mentioned in Japanese Patent Laid-Open Application No. 6-290496 above, the force for moving the domain wall depends on the temperature gradient.

Hence, in the neighborhood of x3 with a small temperature gradient, the following situation is obtained:
1. The domain wall does not move.
2. Wall motion is slow, and the next domain is transferred and begins to move before completion of the motion, thus disturbing enlarged reproduction of the domain by wall motion.
3. Since the second temperature peak position is close to the position x3, the domain enlargement amount is small and contributes little to enlarged reproduction of a domain.

In the above situation, the spot intensity on the actual recording medium is set by gradually increasing the spot intensity and confirming that enlarged reproduction of a domain from the position x3 side stops while observing the enlarged reproduction of the domain from the position x3 side.

The period from x2 to x3 is not fixed and has a uniform direction of magnetization (in FIGS. 14 and 15, magnetization in the up direction) since the temperature is equal to or higher than Ts.

As described above, by giving a staircase-like phase distribution to a light flux coming from a light source, a temperature distribution having a region in which the temperature does not monotonously decrease from the temperature peak position in the upstream side in the moving direction of the recording medium is formed on the recording medium, and the wall motion start temperature is set in the neighborhood of that region. Hence, wall motion reproduction free from any crosstalk arising from wall motion on the downstream side in the moving direction of the recording medium can be achieved even using a spot formed by a single light source.

In this example, reproduction of information on the recording medium has been exemplified. When information is recorded on the recording medium, the magnetic head 711 applies a magnetic field corresponding to information to be recorded on the recording medium while irradiating a laser beam for heating the medium to a predetermined temperature in the state wherein the phase filter 73 or 713 shown in FIG. 9 is set, thus forming domains corresponding to the information to be recorded in the third magnetic layer of the recording medium. Hence, both recording and reproduction of information can be achieved by the same arrangement as that shown in FIG. 9.

What is claimed is:

1. A method for reproducing information on a recording medium comprised of first, second and third magnetic layers each of which layers having a perpendicular magnetization film and laminated in said order and having an information track, wherein a magnetic domain recorded in the third magnetic layer is transferred into the first and second magnetic layers by exchange coupling, comprising the steps of:

irradiating the information track with a laser beam in the direction of the first magnetic layer side to make a high temperature region having a temperature distribution containing at least two peaks appear along the longitudinal direction of the information track;

moving the laser beam and the recording medium relative to each other along the longitudinal direction of the information track, wherein a magnetization of the second magnetic layer disappears in the high temperature region, and when a domain wall of a magnetization transferred into the first magnetic layer enters a border of the high temperature region, the domain wall is displaced in the longitudinal direction of the information track in accordance with the temperature distribution; and detecting a reflected light of the laser beam to reproduce the information.

2. A method according to claim 1, wherein the temperature distribution is formed by a single laser beam.

3. A method according to claim 2, wherein the temperature distribution is formed by giving a phase distribution to the laser beam.

4. A method according to claim 3, wherein the phase distribution is formed by a phase filter having a plurality of steps to form a phase difference.

5. A method according to claim 4, wherein the phase difference of the phase filter falls within a range from $5\cdot\pi/8$ to $7\cdot\pi/8$.

6. A method according to claim 5, wherein the phase difference is $3\cdot\pi/4$.

7. A method according to claim 1, wherein the temperature distribution is formed by two laser beams.

8. A method according to claim 7, wherein the two laser beams have different wavelengths.

9. A method according to claim 7, wherein a spacing d between centers of the two laser beams satisfies:

$$(\lambda_1+\lambda_2)/2\times(2/\pi)\times(\lambda_1/NA)<d<2\times(\lambda_1+\lambda_2)/2\times(2/\pi)\times(\lambda_2/NA)$$

where $\lambda_1$ and $\lambda_2$ are the wavelengths of the two laser beams, and NA is the numerical aperture of an objective lens that focuses the laser beams on the medium.

10. A method according to claim 1, wherein the recording medium has a plurality of the information tracks juxtaposed and the information tracks adjacent to each other are magnetically separated from each other.

11. A method according to claim 10, wherein each interval portion between the information tracks is comprised of a groove formed on the recording medium and each information track is comprised of a land divided by the grooves.

12. A method according to claim 10, wherein magnetism in the interval portion between the information tracks disappears by annealing.

13. An apparatus for reproducing information on a recording medium comprised of first, second and third magnetic layers each of which layers is comprised of a perpendicular magnetization film and laminated in said order and having an information track, wherein a magnetic domain recorded in the third magnetic layer is transferred into the first and second magnetic layers by exchange coupling, comprising:

a laser light source emitting the laser beam;

an optical system for irradiating the laser beam emitted by said light source onto the recording medium, wherein a high temperature region having a temperature distribution containing at least two peaks is made to appear along a longitudinal direction of the information track by the irradiation of the recording medium with the laser beam;

a motor for moving the laser beam and the recording medium relative to each other along the longitudinal direction of the information track, wherein a magnetization of the second magnetic layer disappears in the high temperature region, and when a domain wall of a magnetization transferred into the first magnetic layer enters a border of the high temperature region, the domain wall is displaced in the longitudinal direction of the information track in accordance with the temperature distribution; and a photo detector for detecting a reflected light of the laser beam from the recording medium.

14. An apparatus according to claim 13, wherein said apparatus comprises two laser light sources equivalent to said laser light source, and two laser beams are irradiated onto the medium.

15. An apparatus according to claim 13, wherein a phase filter having a plurality of steps to form a phase difference is inserted in said optical system, and a single laser beam which is partially given the phase difference is irradiated onto the medium.

16. An apparatus for reproducing information according to claim 13, wherein said recording medium is comprised of a magneto-optical disc, and said motor is comprised of a spindle motor for rotating said magneto-optical disc.

* * * * *

UNITED STATES PATENT AND TRADEMARK OFFICE
CERTIFICATE OF CORRECTION

PATENT NO. : 5,995,472
DATED : November 30, 1999
INVENTOR(S) : EIICHI FUJII, ET AL.

It is certified that error appears in the above-identified patent and that said Letters Patent is hereby corrected as shown below:

COLUMN 11

Line 45, "$0<\alpha<\pi$" should read --$0\leq\alpha<\pi$--.

COLUMN 12

Line 20, "$5\cdot\sigma/8$," should read --$5\cdot\pi/8$,--; and

Line 46, should be moved to line 47, to make a single paragraph.

Signed and Sealed this

Second Day of January, 2001

Attest:

Q. TODD DICKINSON

*Attesting Officer*  *Commissioner of Patents and Trademarks*